United States Patent [19]
Ormond

[11] 3,968,683
[45] July 13, 1976

[54] ELECTRICAL EQUALIZATION OF LOAD ELEMENT SENSITIVITY

[76] Inventor: Alfred Neuman Ormond, 11969 F. Rivera Road, Sante Fe Springs, Calif. 90670

[22] Filed: June 2, 1975

[21] Appl. No.: 582,729

[52] U.S. Cl. ............................... 73/141 A; 177/211
[51] Int. Cl.² ............................................ G01L 1/22
[58] Field of Search ............. 73/141 A, 1 B, 88.5 R; 177/211

[56] References Cited
UNITED STATES PATENTS
3,576,128  4/1971  Lockert ........................... 73/141 A Primary Examiner—Charles A. Ruehl
Attorney, Agent, or Firm—Ralph B. Pastoriza

[57] ABSTRACT

The sensitivity of two or more load elements and associated strain gauges supporting a platform are equalized by shunting two or more of the strain gauges in the electrical output bridge circuit with appropriate resistances. By making the sensitivities of all of the load elements and their associated strain gauges the same, the output signal reading indicating a load will be the same for center and off-center positions of the load on the platform.

7 Claims, 13 Drawing Figures

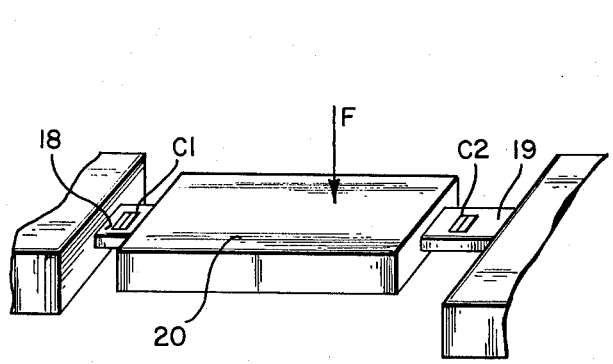
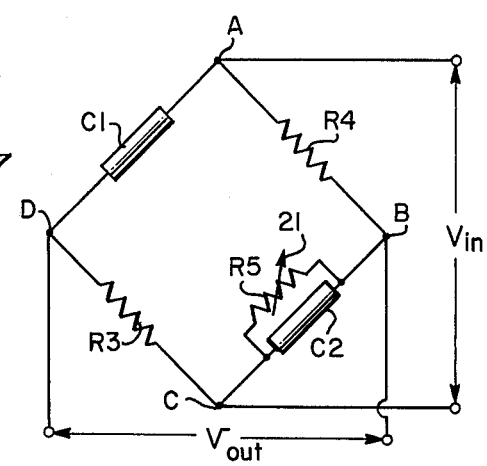
FIG.8                   FIG.9
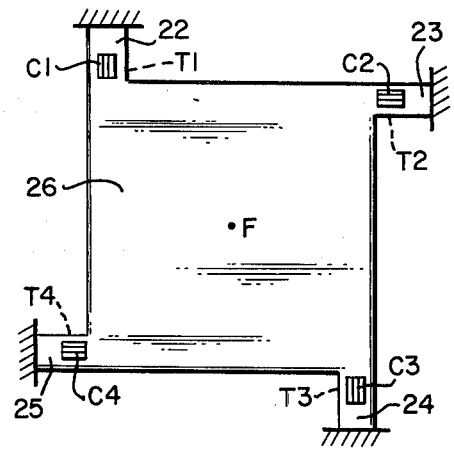
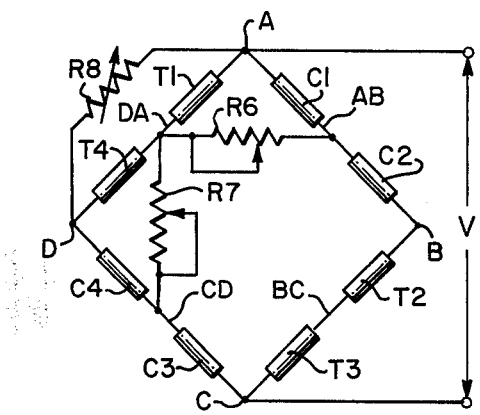
FIG.10                  FIG.11
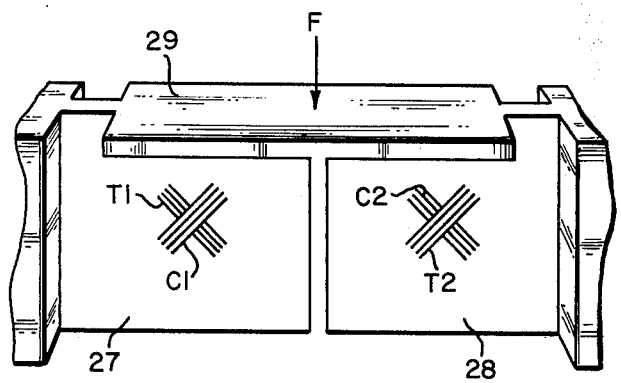
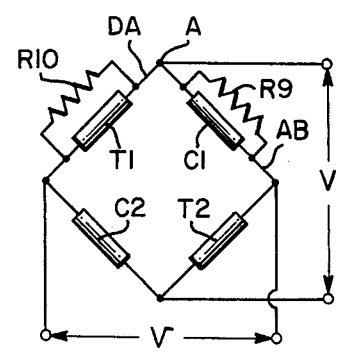
FIG.12                  FIG.13

ELECTRICAL EQUALIZATION OF LOAD ELEMENT SENSITIVITY

This invention relates to a system of electrically effecting equalization of load element sensitivity to adjust for off-center loading on a platform supported by two or more load elements to which strain gauges are secured.

BACKGROUND OF THE INVENTION

Utilizing load elements to which strain gauges are attached for supporting a platform such as might be used as a weighing scale are well known in the art although for many applications, they are not always accepted. In certain heavy duty applications such as truck weighing or thrust measurements, load elements with attached strain gauges are sometime the only practical means of providing an indication of the forces involved. In various other better known applications such as postage weighing scales, meat counter scales and the like wherein the loads are much lighter problems have arisen primarily as a result of off-center loading on the platform of the object to be weighed.

Improved design of the load elements as well as the associated strain gauges wherein are includes which will isolate the load element and strain gauges from extraneous forces such as undesirable moments and side forces created by an off-center loading have been proposed.

While effective isolation of undesired moments and side forces from off-center loading can be achieved, the primary and most troublesome problem in weighing scales incorporating load elements and strain gauges is the fact that the sensitivities of each of the load elements and their associated strain gauges are not equal. Even though the load element itself, either in the form of a column or bending web or even a shear plate may be made identically to each other for supporting the weighing platform at various locations and even though strain gauges themselves can be manufactured within fairly close tolerances, when the device is completely assembled, more often than not the actual output signal from the electrical bridge incorporating the strain gauges changes when the load is shifted to different off-center positions.

Will respect to the foregoing, it should be understood that the output signal is directly proportional to the applied load but the slope of the output signal which constitutes a measure of the sensitivity will more often than not be different when the position of the load is shifted. If there were some means of equalizing the slope of the output signal for all positions of the load or force, then errors as a consequence of off-center loading on the platform resulting from different sensitivities of the supporting load elements would be virtually eliminated.

In my copending patent application Ser. No. 561,108 filed Mar. 24, 1975 and entitled MECHANICAL EQUALIZATION OF STRAIN GAUGE SENSITIVITY, there is disclosed a mechanical method of equalizing the sensitivities of the strain gauges and associated load cells to the end that the foregoing problems can be overcome. This mechanical equalization procedure involves the comparing of the output signal from the strain gauge bridge when the applied load is positioned off-center over one element to the output signal when positioned off-center over the other element. Thereafter, material is progressively physically removed from one element to change its physical rigidity under the given load until the measured output sensitivity is equaled in each of the various positions of the load.

While the foregoing procedure provides a solution to the overall problem, the required machining operations can add to the overall expense of the particular weighing scale. Moreover, equalization of the sensitivities of the load elements is very difficult to achieve in the field.

BRIEF DESCRIPTION OF THE PRESENT INVENTION

The present invention contemplates an alternative method and apparatus of equalizing the strain gauge sensitivities of at least two and more usually a plurality of spaced load elements so that the output signal derived from at least four strain gauges, two of which are tension gauges and two of which are compression gauges wherein each load element has secured to it one tension gauge and one compression gauge, is the same for different positions of a given load on the platform.

Essentially the method steps include the provision of a strain gauge bridge circuit having four legs in which two tension strain gauges are respectively in opposite legs and two compression strain gauges are respectively in the remaining opposite legs. An input voltage is applied to opposite corners of the bridge and an output signal derived from the remaining opposite corners. Output signals from the bridge when a given load is first positioned off-center to one element than the other and then shifted to an alternate position closer to the other element than the one element are compared. Finally, those tension and compression strain gauges in adjacent legs of the bridge associated with the element exhibiting the most sensitivity are shunted with resistance means of value such that the measured output signals are the same for all positions of the given load on the platform.

The proper positioning of the resistance means is such as to avoid zero shifting of the output signal.

Apparatus for carrying out the method may include column type load elements, flexure web type load elements, or shear plate type load elements, there always being provided at least two strain gauges in the bridge circuit.

It will be appreciated that the equalization procedure as well as the apparatus itself is such that appropriate adjustments can be carried out in the field. Moreover, an entire weighing scale unit can be readily provided with assurance of equalization of strain gauge sensitivity without having to physically alter the load elements.

BRIEF DESCRIPTION OF THE DRAWINGS

A better understanding of the method and apparatus of this invention will be had by now referring to the accompanying drawings in which:

FIG. 8 is a simplified perspective view of a platform wherein flexure type load elements are provided to support the platform;

FIG. 9 illustrates an electrical bridge circuit incorporating the various strain gauges utilized in the load elements of FIG. 8 together with added resistance means in accord with this invention;

FIG. 10 is a simplified plan view of a platform supported by flexure web type load elements;

FIG. 11 illustrates an appropriate bridge circuit in accord with the present invention for the strain gauges utilized in the flexure webs for the platform of FIG. 10;

FIG. 12 is a simplified perspective view of shear plate type load elements for a platform; and, FIG. 13 illustrates a bridge circuit in accord with the present invention incorporating the strain gauges in the shear plates of FIG. 12.

DETAILED DESCRIPTION OF THE INVENTION

Figure 1:
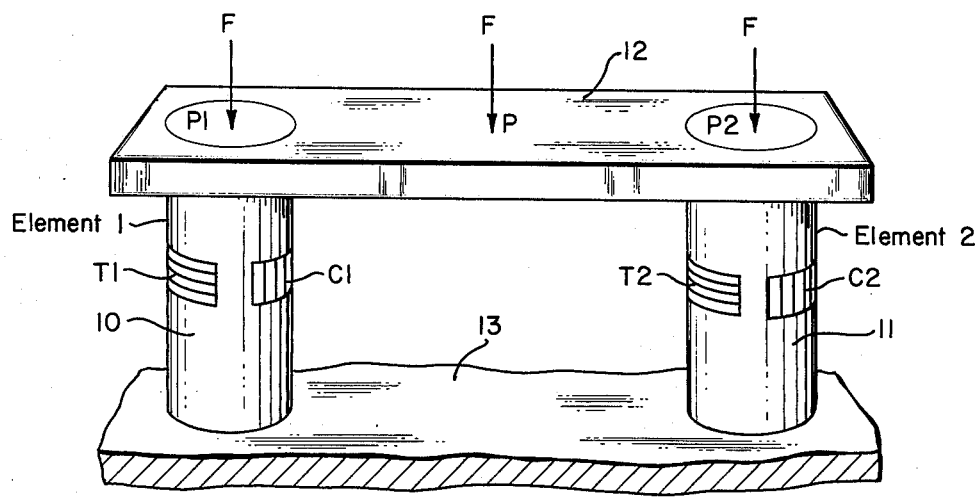
FIG. 1 is a simplified perspective view of a platform and column type load element support useful in illustrating the electrical equalization of the strain gauges and load elements in accord with the present invention.

Referring first to FIG. 1 there are shown two load elements in the form of columns 10 and 11 supporting a platform 12 to which a load or weight F might be applied. The load elements at their lower ends are secured to a rigid frame 13.

As shown, each of the load elements has associated strain gauges such as indicated at T1 and C1 for the column 10 and T2 and C2 for the column 11. Essentially, the strain gauges T1 and T2 measure tension strains due to Poisson's ratio while the strain gauges C1 and C2 are oriented to measure compression strains.

As indicated above, for an accurate indication of the load F by signals from the various strain gauges for any position of the load on the platform, it is essential that the measured output sensitivity at position P1, when the load F is applied over the load element 10 and associated strain gauges T1 and C1 be as close as possible to the sensitivity when the load F is applied over the load element 11 and associated strain gauges T2 and C2 at position P2. Clearly if these sensitivities were different, any off-center loading of the applied force F on the platform 12 would result in different output readings. By assuring equal sensitivities, the proper proportional output signal will be provided regardless of the position of the applied load to the platform.

Figure 2:
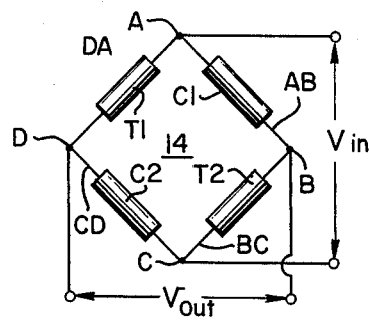
FIG. 2 illustrates the electrical bridge circuit incorporating the strain gauges in the drawing of FIG. 1.

The foregoing will be better understood by referring to FIG. 2 which illustrates a typical bridge circuit 14 incorporating the strain gauges T1, T2 and C1, C2 of FIG. 1. The corners of the strain gauge bridge are respectively designated reading in a clockwise direction by the letters A, B, C and D. The four legs making up the bridge in turn are designated AB, BC, CD, and DA; that is, the legs are designated by the corner letters between which they extend. The diagonally opposite corners A and C are provided with an input voltage $V_{in}$ and the output signal is taken from the other diagonally opposite corners D and B and is designated $V_{out}$. It wiill be noted that the tension gauges T1 and T2 are respectively in opposite legs DA and BC and the two compression gauges C1 and C2 are respectively in the remaining opposite legs AB and CD.

The strain gauges themselves will change in resistance when subjected to a strain as a consequence of an elongation or shortening of the portion of the load element to which they are affixed. The degree of elongation or shortening depends upon the applied force or load. In the case of the columns 10 and 11 of FIG. 1, it will be understood that the downward force will tend to compress the column to provide a change in resistance of the strain gauge C1 while the resulting tendency of the column 10 to circumferentially expand under the compressive force F results in an elongation and thus a change in the resistance of the strain gauge T1.

Figure 3:
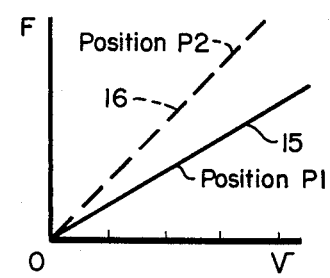
FIG. 3 illustrates output signals as a function of applied load or force for the load elements of FIG. 1.

Referring to FIG. 3 there is shown a plot of the output signal $v$ as a function of the applied load force F. The solid line 15 illustrates, by way of example, the output signal when the load F is applied at position P1 in FIG. 1 while the dashed line 16 indicates the output signal when the load F is applied at position P2.

It will be evident from FIG. 3 that the output signal 15 is of greater sensitivity than the output represented by the dashed line 16. This greater sensitivity is a consequence of the fact that there is a greater variation in the output signal $v$ for a given variation in the applied load F. In essence, the degree of sensitivity is determined by the slope of the plot of the output signal as a function of the force. The steeper the slope, the less is the sensitivity.

In the example of FIG. 3, it has been assumed that the element 1; that is, column 10 and the associated strain gauges T1 and C1 exhibit more sensitivity than element 2; that is, the element 1 is deemed the most sensitive of the two load elements and their associated strain gauges.

In accord with the method and circuit of this invention, after providing the strain gauge bridge circuit with the four legs as described in FIG. 2, the output signals such as indicated at 15 and 16 from the bridge when a given load is first positioned off-center closest to one element then the other and then shifted to an alternate position closer to another element than the one element are compared to determine the element and associated strain gauges exhibiting the most sensitivity. Those tension and compression strain gauges in adjacent legs of the bridge associated with the element exhibiting the most sensitivity are then shunted with resistance means of value such that the measured output signals are the same for all positions of the given load F on the platform. In other words, the shunting resistance means is such that the sensitivity of the most sensitive element is electrically decreased until the output signal 15 of FIG. 3 coincides precisely with the output signal 16.

Figure 4:
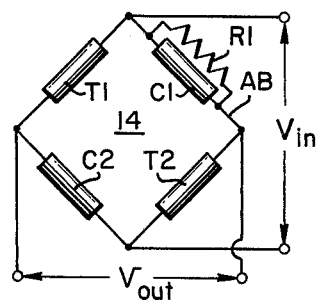
FIG. 4 illustrates a first step in modifying the bridge circuit of FIG. 2 towards equalizing sensitivities.
Figure 5:
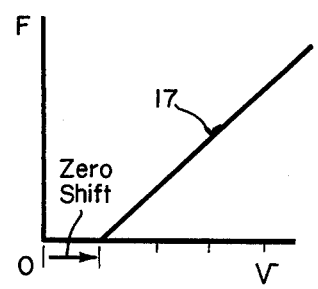
FIG. 5 illustrates a modified output signal as a function of applied force resulting from the modification in the bridge circuit of FIG. 4.

FIG. 4 shows the bridge circuit of FIG. 2 with a portion of the resistance means incorporated in the bridge circuit in the form of the resistance R1 shunting the compression strain gauge C1. This shunting resistance decreases the sensitivity of the strain gauge C1 to in effect steepen the slope of the output signal $v$. However, the simple shunting of only one of the strain gauges results in a shifting of the zero position of the signal as depicted in FIG. 5 wherein the output signal is shown at 17. Thus while the slope or sensitivity of the new output signal 17 is changed from the slope of the dashed signal 16 of FIG. 3, the zero position has been shifted which is undesirable.

Referring to FIG. 6 there is again reproduced the bridge circuit of FIGS. 2 and 4 but wherein the resistance means in accord with the method and circuit of this invention is completed to provide a resistance R2 shunting the tension gauge T1. Shunting of this associated strain gauge will effectively shift the zero position of the output curve 17 back to zero as indicated at 17' in FIG. 7 and change the slope to match 16.

Figure 6:
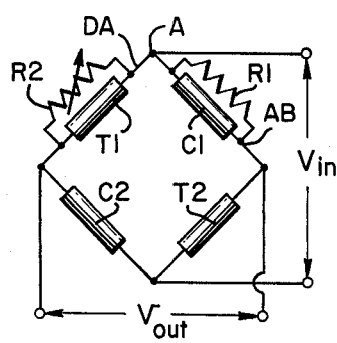
FIG. 6 shows a further modification of the bridge circuit of FIG. 4.
Figure 7:
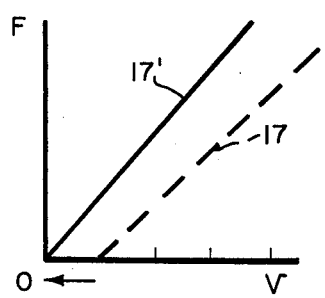
FIG. 7 illustrates a further modified output signal as a function of applied force or load resulting from the circuit of FIG. 6.

Normally, the resistance R1 and R2 are substantially equal, assuming that the strain gauges are all electrically equivalent. However, in actual practice it is not possible to make strain gauges with identical electrical properties. Therefore, in accord with this invention, one of the resistances such as R2 is made variable as indicated in FIG. 6 so that its value may be varied relative to the other resistance, only to the extent necessary to avoid any shifting of this zero point of the output signal as a consequence of differences in the electrical properties of the strain gauges.

The foregoing example of two load elements supporting a platform together with the associated electrical strain gauge bridge having solely four strain gauges represents the simplest version of applicant's invention. In more usual circumstances, there will be provided more than two supporting load elements, each additional load element adding two more strain gauges to the circuit.

Before discussing the addition of further load elements, reference is had to FIG. 8 which shows the simplest version of applicant's invention wherein bending flexure webs 18 and 19 support a weighing platform 20 to which an off-center force F is applied.

Compression strain gauges C1 and C2 are applied to the top surface of the webs and are placed in compression under a load applied to the platform.

Referring to FIG. 9 there is shown the bridge circuit which includes the strain gauges for the load elements 18 and 19 of FIG. 8. Thus, these strain gauges C1 and C2 are in opposite arms of the bridge and fixed resistances R3 and R4 are provided in the other opposite arms. A potentiometer resistance R5 shunts the strain gauge C2 and is variable as indicated by the arrow 21.

In operation, the potentiometer R5 is adjusted to equalize the effective sensitivity of the strain gagues C1 and C2 and their associated load elements 18 and 19. In effect, the potentiometer R5 reduces the output voltage $V_{out}$ as the resistance decreases. However, the change in output voltage $V_{out}$ occurs solely in the leg containing the strain gauge C2 of the bridge and accordingly varies the sensitivity of the strain gauge C2 and the associated load element 19. It is to be understood that the strain of the load elements themselves; that is, the flexure webs are equalized as well as the sensitivities of the strain gauges. It is the combination of the two to provide a total equalization of each strain gauge and associated load element with the other strain gauge and associated load element.

Any zero shifting as might occur as a consequence of adjustment of the potentiometer R5 in FIG. 9 can readily be corrected by physical reduction; for example, by laser trimming, etching, or abrading the surface of the strain gauge itself. For example, foil type gauges can be abraded using a common eraser.

Referring now to FIG. 10 there is shown other types of load elements supporting a platform to provide a weighing scale. In FIG. 10, these load elements take the form of flexure webs 22, 23, 24 and 25 supporting a platform 26 at its corners to a fixed reference. When a force F is applied to the platform (in a direction normal to the plane of the drawing) each of the webs 22, 23, 24 and 25 will bend. Compression and tension strain gauges are affixed to the top and bottom surfaces of each of the webs at the point where they connect to the platform 26 such as indicated at C1, T1 for the web 22, C2, T2 for the web 23, C3, T3 for the web 24, and C4, T4 for the web 25. Bending of the webs at the points where they connect to the platform is such that the top strain gauges will be placed in compression and the underside strain gauges will be placed in tension.

FIG. 11 shows the strain gauge bridge circuit for the system of FIG. 10. Thus, two tension strain gauges T1 and T4 are connected in series in the one leg DA of the bridge and two compression strain gauges C1 and C2 are connected in series in the adjacent leg AB. The remaining two tensions gauges T2 and T3 are connected in series in the leg BC opposite to the one leg DA and the remaining two compression gauges C3 and C4 are connected in series in the remaining leg CD opposite said first mentioned adjacent leg AB. The tension and compression strain gauges in adjacent legs closest to the corner defined by the adjacent legs are secured to the same load element. Thus, the tension gauge T1 and compression gauge C1 are closest to the corner A and are both affixed to the load element 22 of FIG. 10. Similarly, the strain gauges T2 and C2 are associated with the element 23, the strain gauges T3 and C3 associated with the element 24, and the strain gauges T4 and C4 associated with the element 25.

The resistance means for equalizing the sensitivities takes the form of a first resistance R6 shunting the tension and compression strain gauges T1 and C1, it being assumed that the load element 22 of FIG. 10 with which these strain gauges are associated is the most sensitive. A second resistance R7 in turn shunts the tension and compression strain gauges nearest an adjacent corner such as the strain gauges T4 and C4 nearest the adjacent corner D.

In the example of FIG. 11, the resistances R6 and R7 are shown as being adjustable in value. By utilizing potentiometers or adjustable resistances, the sensitivities of the load elements can be adjusted in the field.

In the event of any differences in the electrical properties of the strain gauges which might cause a slight shifting of the zero point of the output signal, an entire leg of the bridge of FIG. 11 may be shunted with a resistance adjusted in value to the extent necessary to avoid such shifting. Such a resistance is shown at R8 shunting the leg DA.

Referring now to FIG. 12, there is set forth an example of load elements in the form of shear plates 27 and 28 supporting a platform 29. Strain gauges are affixed directly to the flat face surface of each of the plates 27 and 28 and so oriented that one of the strain gauges measures tension while the other compression. Thus, there are shown tension gauge T1 and compression gauge C1 for the shear plate 27 and tension gauge T2 and compression gauge C2 for the shear plate 28. It will be appreciated that when a force F is applied to the platform 29, the shear strains developed in the plates 27 and 28 will cause compression forces to be applied to the compression strain gauges C1 and C2 and tension forces to be applied to the strain gauges T1 and T2.

As in the case of the simplified two column load element system described in FIGS. 1 through 7, the strain gauges of FIG. 12 are similarly connected into a bridge circuit as shown in FIG. 13. Equalization of the output signal is effected by the provision of shunt resistances R9 and R10 across the strain gauges C1 and T1 associated with the shear plate exhibiting the most sensitivity.

From all of the foregoing, it will be evident that the present method and system is applicable to many different types of load element-platform configurations. Further, by effecting equalization of the strain gauge and associated load element sensitivities electrically, costly machining operations on the load elements themselves are avoided and appropriate adjustments can be made in the field.

What is claimed is:

1. A method of electrically equalizing the strain gauge sensitivity of at least two spaced load elements supporting a platform so that the output signal derived from at least four strain gauges, wherein each load element has secured to it one compression strain gauge and one tension strain gauge, is the same for different positions of a given load on the platform, comprising the steps of:
   a. providing a strain gauge bridge circuit having four legs including said four strain gauges, the two compression gauges being in opposite legs and the two tension gauges being in the remaining opposite legs;
   b. applying an input voltage to two opposite corners of the bridge;
   c. deriving an output signal from the remaining opposite corners of the bridge;
   d. comparing the output signals from the bridge when a given load is first positioned on said platform off-center closer to one element than the other and then shifted to an alternate position closer to another element than the one element;
   e. shunting a compression gauge and a tension strain gauge in the leg of said bridge associated with the element exhibiting the most sensitivity with first and second substantially equal resistances of value such that the measured output signals are the same for all positions of said given load on said platforms; and
   f. varying the value of one of said resistances relative to the other only to the extent necessary to avoid any shifting of the zero point of said output signal as a consequence of differences in the electrical properties of said strain gauges.

2. A method of electrically equalizing the strain gauge sensitivity of four spaced load elements supporting a platform so that the output signal derived from strain gauges, wherein each load element has secured to it one tension strain gauge and one compression strain gauge, is the same for different positions of a given load on the platform, comprising the steps of:
   a. providing a strain gauge bridge circuit having four legs, two tension strain gauges being connected in series in one leg of said bridge, and two compression strain gauges being connected in series in an adjacent leg of said bridge, the remaining two tension gauges being connected in series in the leg of the bridge opposite to said one leg and the remaining two compression strain gauges being connected in the leg of the bridge opposite said adjacent leg, the tension and compression strain gauges in adjacent legs closer to the particular corner defined by said adjacent legs being secured to the same load element;
   b. shunting the tension and compression strain gauges nearest the corner of the bridge associated with the most sensitive load element with a first resistance;
   c. shunting the tension and compression strain gauges nearest an adjacent corner with a second resistance;
   d. adjusting the value of said first and second resistances such that the measured output signals are the same for all positions of said given load on said platform.

3. The method of claim 2, including the step of shunting an entire leg of said bridge with a resistance adjusted in value to the extent necessary to avoid any shifting of the zero point of said output signal as a consequence of differences in the electrical properties of said strain gauges.

4. An apparatus including a circuit for electrically equalizing strain gauge sensitivity comprising, in combination:
   a. at least two spaced load elements;
   b. a platform supported by said load elements;
   c. at least four strain gauges wherein each load element has secured to it at least one compression strain gauge and one tension strain gauge;
   d. an electrical strain gauge bridge having four legs, two compression strain gauges being in opposite legs and two tension strain gauges being in the remaining opposite legs;
   e. first and second substantially equal resistances shunting a compression strain gauge and a tension strain gauge respectively associated with the load element exhibiting the most sensitivity such that the measured output signal from said bridge when a load is applied off-center on said platform closer to one of said load elements than another, is the same as the output signal when the same load is applied off-center on said platform closer to another of said load elements than the one load element, one of said resistances being variable such that its value may be changed relative to the other only to the extent necessary to avoid any shifting of the zero point of said output signals as a consequence of differences in the electrical properties of said srain gauges.

5. An apparatus according to claim 4, in which said load elements comprise bending webs.

6. An apparatus including a circuit for electrically equalizing strain gauge sensitivity comprising, in combination:
   a. four spaced load elements;
   b. a platform supported by said load elements;
   c. eight strain gauges, wherein each load element has secured to it one compression strain gauge and one tension strain gauge;
   d. an electrical strain gauge bridge having four legs, two tension strain gauges being connected in series in one leg of said bridge and two compression strain gauges being connected in series in an adjacent leg of said bridge, the remaining two tension gauges being connected in series in the leg of the bridge opposite to said one leg and the remaining two compression gauges being connected in series in the remaining leg of the bridge opposite said adjacent leg, the tension and compression strain gauges in adjacent legs closest to the corner defined by said adjacent legs being secured to the same load element; and,
   e. a first resistance shunting the tension and compression strain gauges nearest the corner of the bridge associated with the most sensitive load element and having a value such that the measured output signal from said bridge when the load is applied off-center on the platform closer to one of the elements than another is the same as the output signal when the same load is applied off-center on the platform closer to another of the load elements than the one load element.

7. An apparatus according to claim 6, including a second resistance shunting the tension and compression strain gauges nearest an adjacent corner, and in which said resistance means further includes a variable resistance shunting an entire leg of said bridge, the value of said variable resistance being adjusted to the extent necessary to avoid any shifting of the zero point of said output signal as a consequence of the differences in the electrical properties of said strain gauges.

* * * * *